US009367885B2

(12) United States Patent
Hua (10) Patent No.: US 9,367,885 B2
(45) Date of Patent: Jun. 14, 2016

(54) METHOD AND SYSTEM FOR ADDING AND DETECTING WATERMARK

(71) Applicant: TENCENT TECHNOLOGY (SHENZHEN) COMPANY LIMITED, Shenzhen, Guangdong Province (CN)

(72) Inventor: You-Wei Hua, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 14/246,088

(22) Filed: Apr. 5, 2014

(65) Prior Publication Data

US 2014/0219495 A1 Aug. 7, 2014

Related U.S. Application Data

(63) Continuation of application No. PCT/CN2013/074239, filed on Apr. 16, 2013.

(30) Foreign Application Priority Data

Apr. 20, 2012 (CN) .......................... 2012 1 0118911

(51) Int. Cl.
*G06T 1/00* (2006.01)
*H04L 29/08* (2006.01)
*H04L 29/06* (2006.01)

(52) U.S. Cl.
CPC .............. *G06T 1/0021* (2013.01); *H04L 63/08* (2013.01); *H04L 67/02* (2013.01); *H04L 2463/103* (2013.01)

(58) Field of Classification Search
CPC . G06T 1/0021; H04L 2463/103; H04L 63/08; H04L 67/02
See application file for complete search history.

(56) References Cited

U.S. PATENT DOCUMENTS 6,141,753 A 10/2000 Zhao et al.
6,847,948 B1 * 1/2005 Paolini ................. G06Q 30/018
380/277

(Continued)

FOREIGN PATENT DOCUMENTS

CN 101026481 A 8/2007
CN 101206861 A 6/2008

(Continued)

OTHER PUBLICATIONS

Zhao, Applying Digital Watermarking Techniques to Online Multimedia Commerce, Proc. of the International Conference on Imaging Science, Systems, and Applications (CISSA97), Jun. 30-Jul. 3, 1997, Las Vegas, USA.*

(Continued)

*Primary Examiner* — Stephen R Koziol
*Assistant Examiner* — Pinalben Patel
(74) *Attorney, Agent, or Firm* — Cheng-Ju Chiang (57) ABSTRACT

A watermarking method and system are provided. The watermarking system includes a server and a client in communication with each other. At first, the client sends a login request to the server. The server authenticates an access right of the client to access specific multimedia data and generates an identification code uniquely associated with the client according to the login request if the client is authenticated to have the access right to access the multimedia data. An on-screen watermark is generated according to the identification code and added onto the multimedia data to be played. The watermark-generating and adding step may be performed by either the server or the client. The on-screen watermark can be detected by a watermark-detecting method and system to trace privacy source.

11 Claims, 8 Drawing Sheets

(56) References Cited

U.S. PATENT DOCUMENTS

| | | | | |
|---|---|---|---|---|
| 7,231,526 | B2* | 6/2007 | Hon | G06Q 20/367 380/262 |
| 7,526,795 | B2* | 4/2009 | Rollins | G06F 21/602 380/282 |
| 8,189,863 | B1* | 5/2012 | Rucklidge | G06T 1/0028 713/176 |
| 8,838,977 | B2* | 9/2014 | Winograd et al. | 713/176 |
| 2002/0186844 | A1* | 12/2002 | Levy | G06F 17/30017 380/231 |
| 2006/0010075 | A1* | 1/2006 | Wolf | G06Q 30/06 705/57 |
| 2006/0075243 | A1* | 4/2006 | Lakamp | G06T 1/0021 713/176 |
| 2006/0127037 | A1* | 6/2006 | Van Hoff | G06F 3/0481 386/233 |
| 2007/0022469 | A1* | 1/2007 | Cooper et al. | 726/3 |
| 2007/0130467 | A1* | 6/2007 | Beck et al. | 713/176 |
| 2009/0138484 | A1* | 5/2009 | Ramos | G06F 17/30 |
| 2013/0325622 | A1* | 12/2013 | Kamitani | G06Q 30/0267 705/14.64 |
| 2013/0332971 | A1* | 12/2013 | Fisher | H04N 21/266 725/93 |
| 2015/0256333 | A1* | 9/2015 | Hashimoto | H04L 9/0816 713/168 |

FOREIGN PATENT DOCUMENTS

| | | |
|---|---|---|
| CN | 101447005 A | 6/2009 |
| CN | 101951318 A | 1/2011 |
| CN | 102073826 A | 5/2011 |
| CN | 102307320 A | 1/2012 |
| EP | 0898396 A2 | 2/1999 |
| WO | 2013/163921 A1 | 11/2013 |

OTHER PUBLICATIONS

Zhao et. al., Applying Digital Watermarking Techniques to the Online Multimedia Commerce, CISSA97, 1997, Las Vegas, USA.*

* cited by examiner

METHOD AND SYSTEM FOR ADDING AND
DETECTING WATERMARK

CROSS-REFERENCE TO RELATED
APPLICATION

This application is a continuation application of International (PCT) Patent Application No. PCT/CN2013/074239 filed on Apr. 16, 2013, now pending and designating the United States, which also claims benefit of China Patent Application No. 201210118911.5, filed on Apr. 20, 2012. The entirety of the above-mentioned patent applications is hereby incorporated by reference herein and made a part of this specification.

FIELD OF THE INVENTION

The present disclosure relates to a field of multimedia, and more particularly to a method and a system for adding or detecting a watermark in a multimedia file.

BACKGROUND OF THE INVENTION

Because of the rapid development of network and multimedia technologies, various multimedia data such as video files can be easily accessed through network. Although convenience of using the accessed multimedia data is undeniable, there are potential risks for security of the multimedia data. For example, pirates can spread huge multimedia data at low costs without authorization from creators or owners of the multimedia data, and such piracy impacts copyright and discourages creations. It is necessary to combine copyright information to the multimedia data to inhibit copyright infringement. A known method is to embed digital watermark in the multimedia data. Digital watermarking is a process of hiding digital information, which may include copyright information, in redundant data of the multimedia data according to a specific algorithm. Digital watermarks may be used to verify the authorization or integrity of the multimedia data so as to protect the intellectual property of legal owners of the multimedia data.

The digital watermark is usually embedded in the multimedia data before distribution or during playing. However, such action cannot effectively reduce piracy because the invisible digital watermark can be eliminated by non-contact image-capturing or recording. Even though an illegal copy is seized, the legal owner cannot trace the original distributor of the illegal copy since the digital watermark is removed and cannot be restored for inspection.

SUMMARY OF THE INVENTION

The present disclosure provides a watermarking method and a client/server of a watermarking system for generating a watermark which can be traced and is not eliminated by non-contact copying.

The present disclosure further provides a watermark-detecting method and system for tracing a release source of the multimedia data by detecting the watermark.

According to an aspect of the present disclosure, the watermarking method is used with a client for watermarking multimedia data. The watermarking method includes: sending a login request to a server; receiving an identification code from the server; generating an on-screen watermark according to the identification code corresponding to the client; and adding the on-screen watermark onto the multimedia data. In response to the login request, the server authenticates an access right of the client to access the multimedia data and generates the identification code uniquely associated with the client according to the login request.

According to another aspect of the present disclosure, the watermarking method is used with a server for watermarking multimedia data. The watermarking method includes: receiving a login request from a client; authenticating an access right of the client to access the multimedia data in response to the login request; generating an identification code uniquely associated with the client according to the login request if the client is authenticated to have the access right to access the multimedia data; and enabling the client to display the multimedia data with an on-screen watermark generated according to the identification code uniquely associated with the client.

In an embodiment, the identification code is sent to the client. Upon receiving the identification code, the client generates an on-screen watermark according to the identification code uniquely associated with the client and adds the on-screen watermark onto the multimedia data.

In an embodiment, the server generates the on-screen watermark according to the identification code uniquely associated with the client, adds the on-screen watermark onto the multimedia data, and sends the multimedia data with the on-screen watermark to the client.

According to a further aspect of the present disclosure, the watermarking method is used with a client for watermarking multimedia data. The watermarking method includes: sending a login request to a server; and receiving the multimedia data with an on-screen watermark from the server. In response to the login request, the server authenticates an access right of the client to access the multimedia data, generates an identification code uniquely associated with the client according to the login request, adds an on-screen watermark onto the multimedia data according to the identification code uniquely associated with the client, and sends the multimedia data with the on-screen watermark to the client.

According to a further aspect of the present disclosure, a watermark-detecting method is used with a watermark-detecting system for detecting a watermark added onto multimedia data. The watermark-detecting method includes: retrieving the watermark from the multimedia data; analyzing the watermark to obtain an identification code; and looking the identification code up in an identification database to find out corresponding client information. The watermark is previously generated according to the identification code and the identification code corresponds to one client. The identification database stores many identification codes and associated client information.

According to a further aspect of the present disclosure, a client of a watermarking system for watermarking multimedia data is provided. The client includes a login-requesting unit, a code-receiving unit and a superimposing unit. The login-requesting unit is configured to send a login request to a server of the watermarking system which authenticates an access right of the client to access the multimedia data and generates an identification code uniquely associated with the client according to the login request. The code-receiving unit is configured to receive the identification code from the server. The superimposing unit is configured to generate an on-screen watermark according to the identification code uniquely associated with the client and superimpose the on-screen watermark on images of the multimedia data.

According to a further aspect of the present invention, a server of a watermarking system for watermarking multimedia data is provided. The server includes an authenticating unit and a code-generating unit. The authenticating unit is configured to receive a login request from a client of the watermarking system and authenticating an access right of the client to access the multimedia data in response to the login request. The code-generating unit is configured to generate an identification code uniquely associated with the client according to the login request if the client is authenticated to have the access right to access the multimedia data. The client is enabled to display the multimedia data with an on-screen watermark generated according to the identification code uniquely associate with the client.

In an embodiment, the server further includes a code-sending unit configured to send the identification code to the client which generates an on-screen watermark according to the identification code uniquely associated with the client and adds the on-screen watermark onto the multimedia data.

In an embodiment, the server further includes a superimposing unit and a data-sending unit. The superimposing unit is configured to generate the on-screen watermark according to the identification code uniquely associated with the client and superimpose the on-screen watermark on images of the multimedia data. The data-sending unit is configured to send the multimedia data with the on-screen watermark to the client.

According to a further aspect of the present disclosure, a client of a watermarking system for watermarking multimedia data is provided. The client includes a login-requesting unit and a data-receiving unit. The login-requesting unit is configured to send a login request to a server of the watermarking system which authenticates an access right of the client to access the multimedia data, generates an identification code uniquely associated with the client according to the login request, adds an on-screen watermark onto the multimedia data according to the identification code uniquely associated with the client, and sends the multimedia data with the on-screen watermark to the client. The data-receiving unit is configured to receive the multimedia data with the on-screen watermark from the server.

According to a further aspect of the present disclosure, a watermark-detecting system can detect a watermark added onto multimedia data. The watermark-detecting system includes a retrieving unit, an analyzing unit and a look-up unit. The retrieving unit is configured to retrieve the watermark from the multimedia data. The analyzing unit is configured to analyze the watermark to obtain an identification code, wherein the watermark is generated according to the identification code which corresponds to one client. The look-up unit is configured to look the identification code up in an identification database to find out corresponding client information. The identification database stores many identification codes and associated client information.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
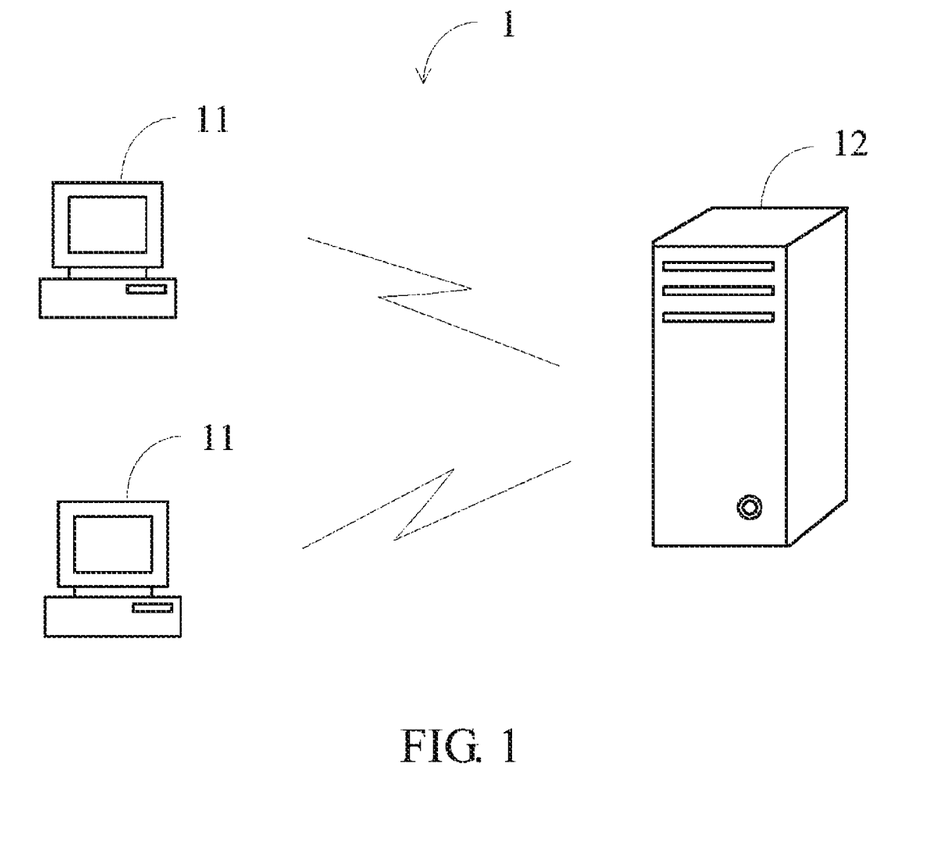
FIG. 1 is a schematic diagram illustrating one embodiment of a watermarking system.

Please refer to FIG. 1, a schematic diagram illustrating one embodiment of a watermarking system. The watermarking system 1 includes at least one client 11 and a server 12 in communication with each other. The client 11 registers one account in the server 12 so that the server 12 may identify the client 11 when the client 11 is logged in the server 12 with the account. If the server 12 confirms that the client 11 is allowed to access specific multimedia data, the server 12 generates an identification code associated with the client 11. Each client 11 has its own unique identification code. The client 11 is enabled to display the multimedia data with an on-screen watermark generated according to the identification code uniquely associated with the client 11. The on-screen watermark corresponding to the unique identification code will be added onto the multimedia data before playing or broadcasting the multimedia data. The on-screen watermark may be generated and attached to the multimedia data by the server 12 or the client 11 according to practical designs or requirements. If the server 12 performs the watermarking, the multimedia data are shown on a screen of the client 11 after the client 11 receives the watermarked multimedia data sent from the server 12. Otherwise, the client 11 receives the multimedia data and the unique identification code respectively, generates an on-screen watermark according to the unique identification code, superimposes the on-screen watermark on the multimedia data, and shows the watermarked multimedia data on a screen of the client 11.

It is to be noted that the client 11 described in the present embodiment maybe computer hardware or software that can use a service provided by a server 12 through a network. For some servers, a computer device is considered as a single client; for other servers, a computer device may be associated with more than one client because several accounts are registered in the server 12 through the computer device. In the present specification, sometimes a web browser or video player software installed in a computer device capable of issuing access request to the server 12 is also considered as a client 11. Besides, any known authentication method can be used by the servers 12, if possible.

The above-mentioned multimedia data include a combination of text, audio, still images, animation, video, or interactive content. The client 11 may play or broadcast the multimedia data by means of any proper software or hardware.

Embodiment 1

Figure 2:
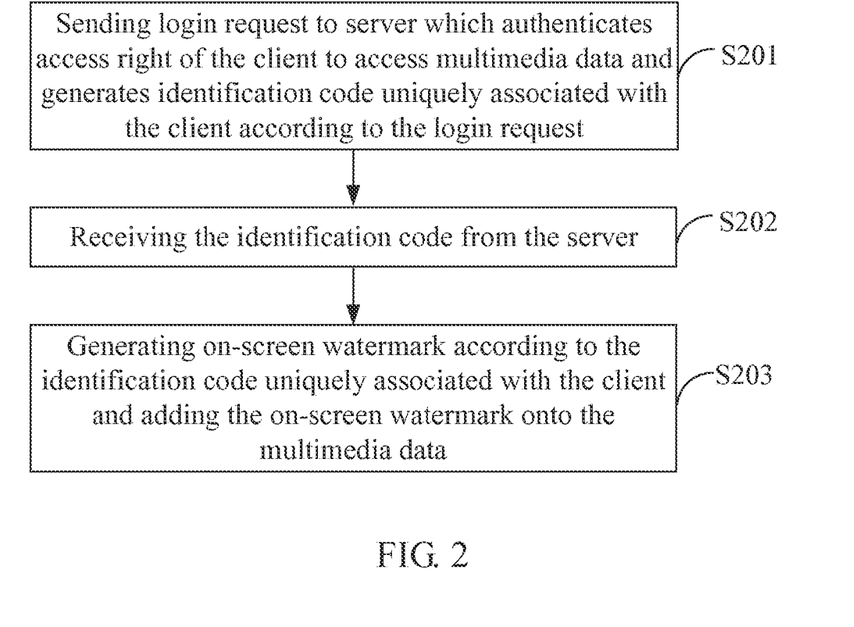
FIG. 2 is a flow chart illustrating one embodiment of a watermarking method for a client-side terminal.

One embodiment of a watermarking method performed by a client is described in detail with reference to a flow chart in FIG. 2. In step S201, the client 11 sends a login request to the server 12. The server 12 will authenticate an access right of the client 11 to access multimedia data and generate an identification code that is uniquely associated with the client 11 according to the login request. Before the login step, the client 11 should register an account in the server 12. The register information of every client 11 is stored in the server 12. When the client 11 is required to show or play the multimedia data received from the server 12, the client 11 has to log in the server 12, and the server 12 can identify the client 11 based on the login request and the register information stored in the server 12. Therefore, the server 12 can check whether the client 11 is allowed to access or play the multimedia data. The client 11 may be video player software or a web browser.

In step S202, the client 11 receives the identification code sent from the server 12. The identification code of each client 11 is unique. Sometimes, one identification code is associated with only one client, but one client may have at least one unique identification code for trace purpose. The unique identification code may be encrypted by the server 12 to enhance security of on-screen watermark.

In step S203, the client 11 generates the on-screen watermark according to the identification code that is uniquely associated with the client 11 and adds the on-screen watermark onto the multimedia data. In the present embodiment, the on-screen watermark is superimposed on images of the multimedia data, and the multimedia data may be video data, animation data or text data. Furthermore, the client 11 receives a digital watermark from the server 12 and embeds the digital watermark in the multimedia data to be played. The server 12 generates the digital watermark associated with the client 11 according to the login request if the client 11 is authenticated to have the access right to access the multimedia data. The digital watermark associated to each client 11 may be, but is not limited to, unique digital watermark. Thus, the played multimedia data include the on-screen watermark and the digital watermark which can effectively reduce infringement intention.

Embodiment 2

Figure 3:
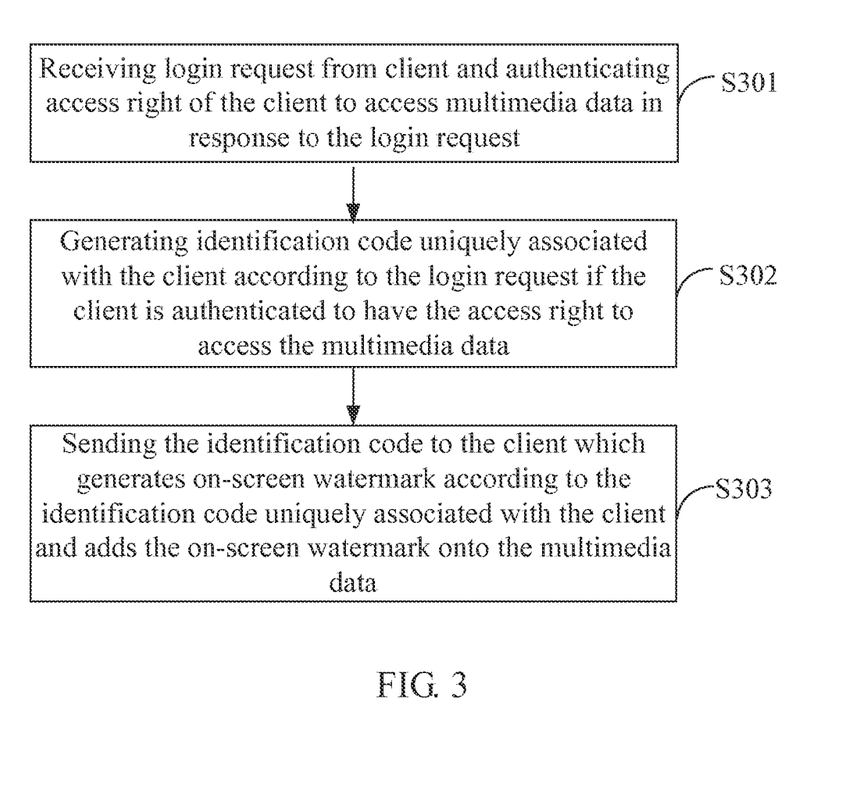
FIG. 3 is a flow chart illustrating one embodiment of a watermarking method for a server-side terminal.

One embodiment of a watermarking method performed by a server is described in detail with reference to a flow chart in FIG. 3. In step S301, the server 12 receives a login request from the client 11 and authenticates an access right of the client 11 accessing the multimedia data in response to the login request. Before the login step, the server 12 has stored register information of the client 11. Upon receiving the login request form the client 11, the server 12 can identify the client 11 based on the login request and the stored register information.

In step S302, the server 12 generates an identification code that is uniquely associated with the client 11 according to the login request if the client 11 is authenticated to have the access right to access the multimedia data. For increasing difficulty in attacking an on-screen watermark attached to the multimedia data, the unique identification code may be encrypted by the sever 12.

In step S303, the server 12 sends the identification code to the client 11 to make the client 11 to generate the on-screen watermark according to the identification code that is uniquely associated with the client 11, and to add the on-screen watermark onto the multimedia data. Furthermore, the server 12 may generate a digital watermark associated with the client 11 according to the login request if the client is authenticated to have the access right to access the multimedia data. Then, the server 12 sends the digital watermark to the client 11 which will embed the digital watermark in the multimedia data. The digital watermark associated to each client 11 may be, but is not limited to, unique digital watermark. Thus, the played or broadcast multimedia data include the on-screen watermark and the digital watermark which can effectively reduce infringement intention.

Embodiment 3

Another embodiment of a watermarking method performed by a client is described in detail with reference to a flow chart in FIG. 4. In step S401, the client 11 sends a login request to the server 12. The server 12 authenticates an access right of the client 11 to access the multimedia data, generates an identification code that is uniquely associated with the client 11 according to the login request, adds an on-screen watermark onto the multimedia data according to the identification code that is uniquely associated with the client 11, and sends the multimedia data with the on-screen watermark to the client 11.

In step S402, the client 11 receives the multimedia data with the on-screen watermark sent from the server 12. In addition to the on-screen watermark, the multimedia data received by the client 11 may be attached with a digital watermark to effectively reduce infringement intention.

Figure 4:
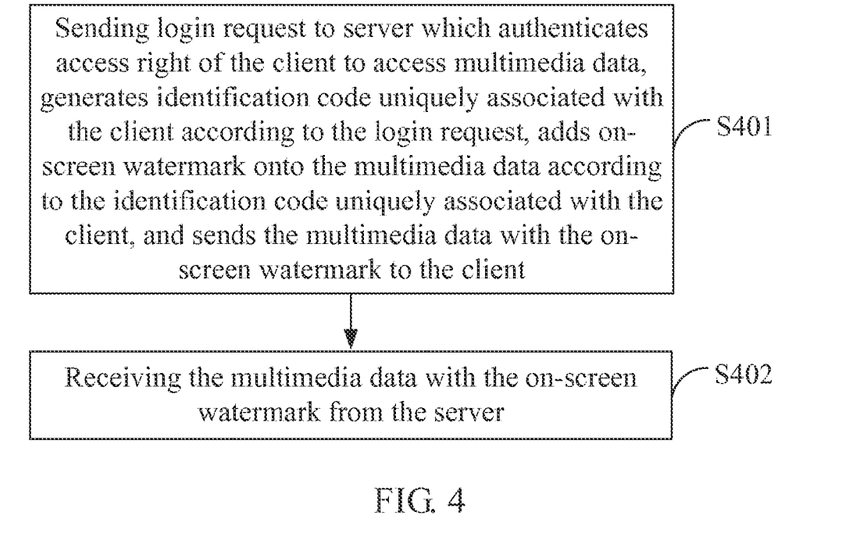
FIG. 4 is a flow chart illustrating another embodiment of a watermarking method for a client-side terminal.

Compared with the method as described with reference to FIG. 2, watermarks associated with different clients 11 in FIG. 4 are generated and attached to the multimedia data by the server 12 before the multimedia data are sent out. Thus, the method of FIG. 4 can prevent the multimedia data from being stolen during the transmission of the multimedia data before watermarking. Since the watermarking steps are performed by the server 12 rather than different clients 11, the overall efficiency of the watermarking system 1 increases because the efficiency of different clients 11 is not anticipatable or controllable sometimes, and the loading of the clients 11 is thus reduced.

Embodiment 4

Another embodiment of a watermarking method performed by a server is described in detail with reference to a flow chart in FIG. 5. In step S501, the server 12 receives a login request from the client 11 and authenticates an access right of the client 11 to access the multimedia data in response to the login request.

In step S502, the server 12 generates an identification code that is uniquely associated with the client 11 according to the login request if the client is authenticated to have the access right to access the multimedia data.

In step S503, the server 12 generates an on-screen watermark according to the identification code that is uniquely associated with the client 11 and adds the on-screen watermark onto the multimedia data. In the present embodiment, the on-screen watermark is superimposed on images of the multimedia data.

In step S504, the server 12 sends the multimedia data with the on-screen watermark to the client 11.

In the embodiment, the method may further include: generating a digital watermark associated with the client 11 according to the login request if the client is authenticated to have the access right to access the multimedia data; embedding the digital watermark in the multimedia data; and sending the multimedia data with the on-screen watermark and the digital watermark to the client 11.

Figure 5:
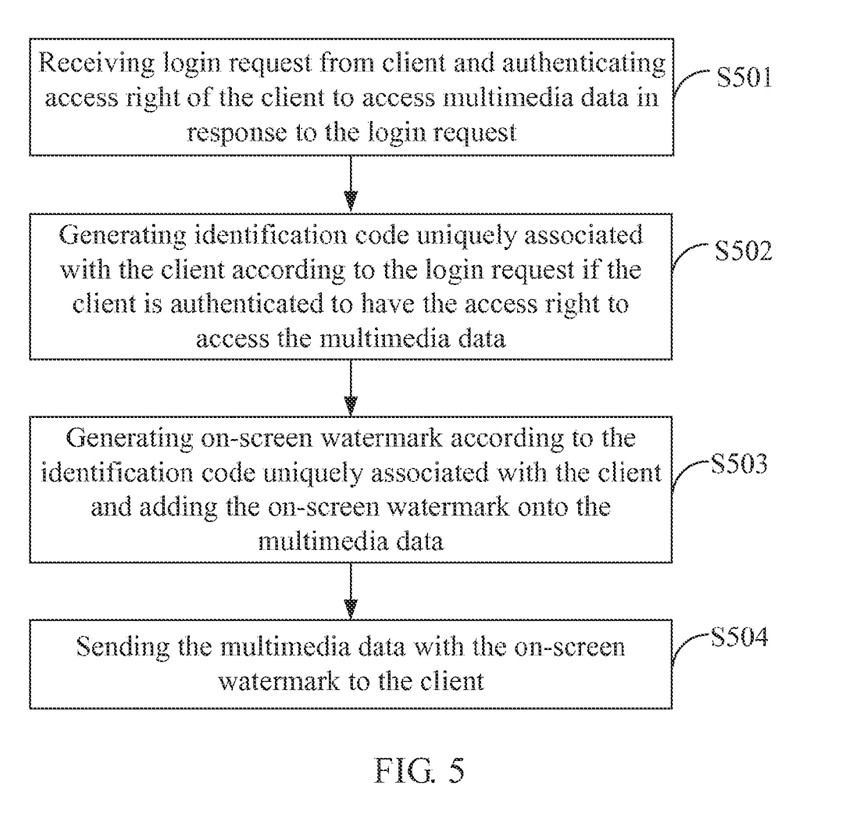
FIG. 5 is a flow chart illustrating another embodiment of a watermarking method for a server-side terminal.

Compared with the method as described with reference to FIG. 3, watermarks associated with different clients 11 in FIG. 5 are generated and attached to the multimedia data by the server 12 before the multimedia data are sent out. Thus, the method of FIG. 5 can prevent the multimedia data from being stolen during the transmission of the multimedia data before watermarking. Since the watermarking steps are performed by the server 12 rather than different clients 11, the overall efficiency of the watermarking system 1 increases, and the loading of the clients 11 is thus reduced.

Embodiment 5

Figure 6:
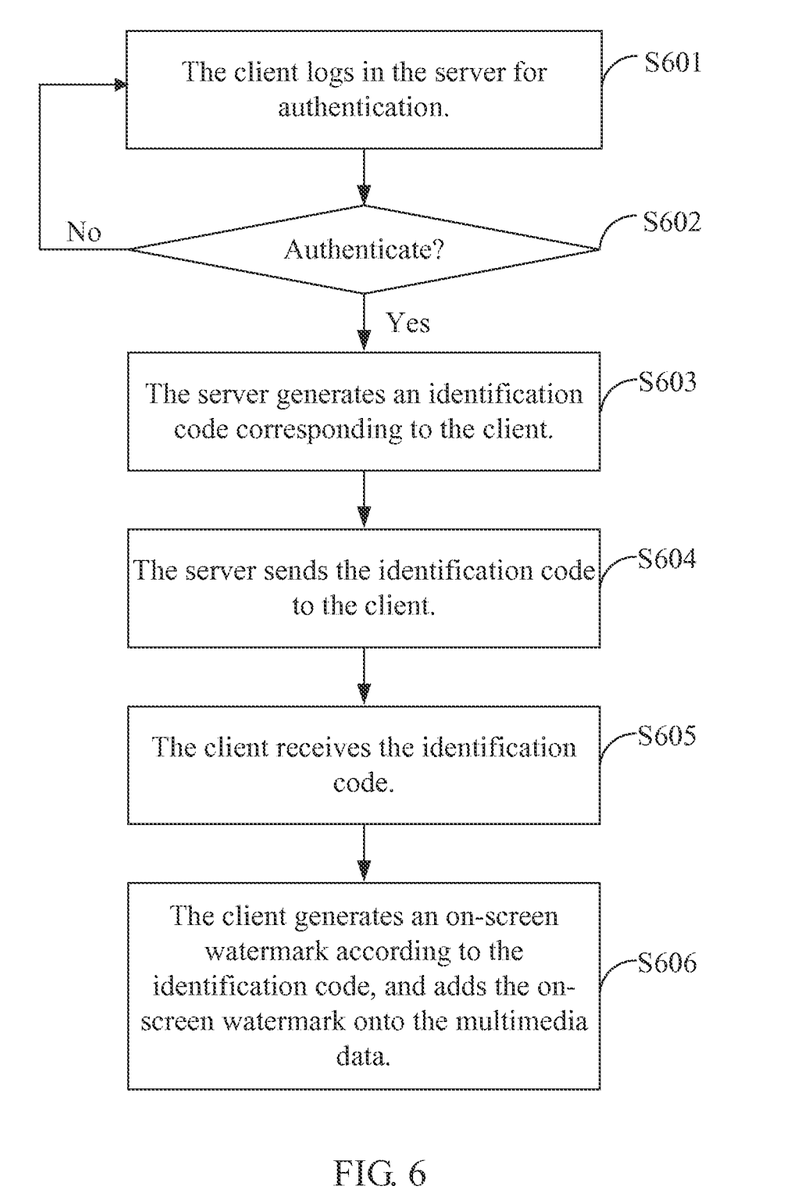
FIG. 6 is a flow chart illustrating one embodiment of a watermarking method for both of a client-side terminal and a server-side terminal.

Please refer to FIG. 6, a flow chart illustrating one embodiment of a watermarking method performed by both of a client and a server. At first, the client 11 sends a login request to the server 12 for authentication (step S601). The authentication may be an identity authentication or an access right authentication, and is detected in step S602. Upon the condition that the server 12 does not authenticate the client 11 to access the multimedia data, the flow returns to step S601. Otherwise, if the server 12 authenticates that the client 11 has an access right to access the multimedia data, the server 12 generates an identification code corresponding to the client 11 (step S603). In the embodiment, each client 11 corresponds to a unique identification code. In other words, different clients 11 correspond to different identification codes. The server 12 sends the identification code to the login client 11 (step S604). The identification code is also stored in an identification database, which records many identification codes and associated client information. For example, the associated client information may include, but not limited to, an IP address, a media access control address (MAC address) of a network interface installed in the client 11, and client's register information or user information. In one embodiment, the identification code is encrypted by the server 12 before the step S604, so that it is difficult to capture and tamper the identification code and the security of accessing the multimedia data is enhanced. After the client 11 receives the identification code (step S605), the client 11 generates an on-screen watermark according to the identification code, and adds the on-screen watermark onto the multimedia data for display, playing, or broadcasting (step S606). The multimedia data and the identification code may be sent from the server 12 during the same login or different logins. The on-screen watermark may be a pattern, a word string, a barcode or a dynamic image which is not recognized by subscribers or viewers. The on-screen watermark may be kept on the same position of images of the multimedia data or dynamically moved to different positions to increase the difficulty of illegal modification. The on-screen watermark should not affect the image context so that it is usually located at corners of the images.

Furthermore, upon authenticating the client 11, the server 12 also generates a digital watermark that is associated with the client 11. Similarly, each client 11 corresponds to a unique digital watermark. Then, the digital watermark is sent to the client 11. Before playing or displaying the multimedia data, the client 11 adds the on-screen watermark onto the multimedia data and embeds the digital watermark in the multimedia data. The digital watermark is usually imperceptible and only perceptible under certain conditions, e.g. after some algorithm. Therefore, it is hard to attack or modify the digital watermark. It offers the multimedia data double security regardless of contact or non-contact copying. The on-screen watermark inhibits the pirate from capturing the multimedia data by non-contact image-capturing or recording, while the digital watermark inhibits the pirate from cloning the original multimedia data and spreading the cloned multimedia data. The multimedia data shown on a screen of the client 11 includes the on-screen watermark and the digital watermark, and the watermarks can effectively reduce the intention of arbitrarily spreading the watermarked multimedia data to avoid copyright infringement.

In the embodiment, the client 11 receives the unique identification code generated by the sever 12, and the client 11 can be identified according to the identification code. The multimedia data are shown together with the on-screen watermark which indicates the unique identification code. It means that the client 11 can be identified by inspecting the on-screen watermark superimposed on the multimedia data. Even though the illegal copy is generated by non-contact manner such as non-contact image-capturing, the release source still can be traced according to the on-screen watermark.

Embodiment 6

Figure 7:
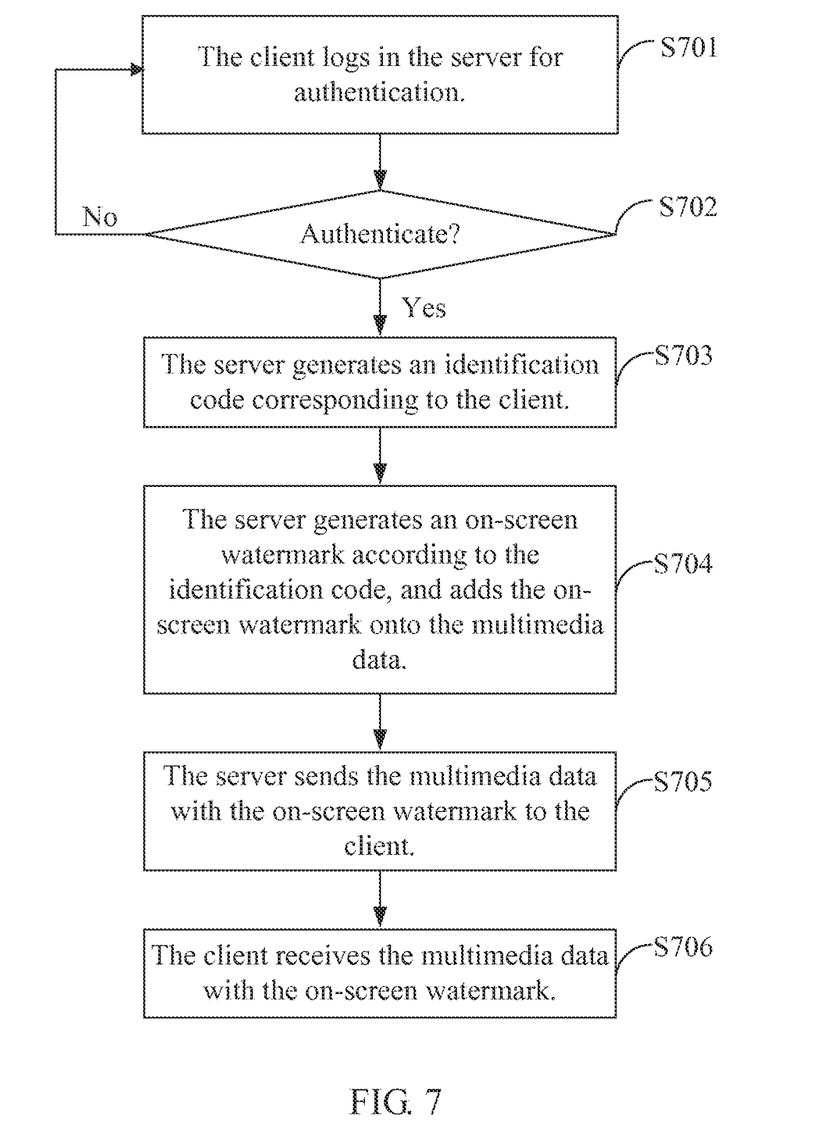
FIG. 7 is a flow chart illustrating another embodiment of a watermarking method for both of a client-side terminal and a server-side terminal.

Please refer to FIG. 7, a flow chart illustrating one embodiment of a watermarking method performed by both of a client and a server. At first, the client 11 sends a login request to the server 12 for authentication (step S701). The authentication may be an identity authentication or an access right authentication, and is detected in step S702. Upon the condition that the server 12 does not authenticate the client 11 to access the multimedia data, the flow returns to step S701. Otherwise, if the server 12 authenticates that the client 11 has an access right to access the multimedia data, the server 12 generates an identification code corresponding to the client 11 (step S703). In the embodiment, the identification code of each client 11 is unique. The identification code is also stored in an identification database, which records many identification codes and associated client information. The server 12 generates an on-screen watermark according to the identification code, and adds the on-screen watermark onto the multimedia data by superimposition (step 704). The on-screen watermark may be kept on the same position of images of the multimedia data or dynamically moved to different positions to increase the difficulty of illegal modification. Then, the server 12 sends the multimedia data with the on-screen watermark to the login client 11 (step S705). At last, the client 11 receives the multimedia data with the on-screen watermark to be viewed (step S706).

Before the login step, there is a register step for the server 12 to record the register information of the client 11, and the register information is used for later authentication. The register step is similar to that described above and repetitious details are not given here.

Upon authenticating the client 11, the server 12 may further generate a digital watermark associated with the client 11 and embed the digital watermark in the multimedia data. Similarly, the digital watermark of each client 11 is unique. Therefore, the watermarked multimedia data received by the client 11 has included the one-screen watermark and the digital watermark. The on-screen watermark inhibits the pirate from capturing the multimedia data by non-contact image-capturing or recording, while the digital watermark inhibits the pirate from cloning the original multimedia data and spreading the cloned multimedia data.

Embodiment 7

The watermark added according to the above-described methods will be detected if infringement occurs. A method for detecting the watermark superimposed on the multimedia data is described in detail with reference to a flow chart in FIG. 8. At first, the watermark added onto the multimedia data is retrieved from the multimedia data to be inspected (step S801). The watermark is analyzed to obtain the identification code (step S802). The watermark is previously generated according to the identification code which corresponds to one client 11. If the identification code is ever encrypted, the encrypted identification code should be decrypted to obtain the unique identification code. There is an identification database stored in the server 12. The identification database records information of every client 11 and corresponding identification code of the every client 11. Thus, the server 12 looks up the identification code obtained in step S802 in the identification database to find out the corresponding client information (step 803).

Figure 8:
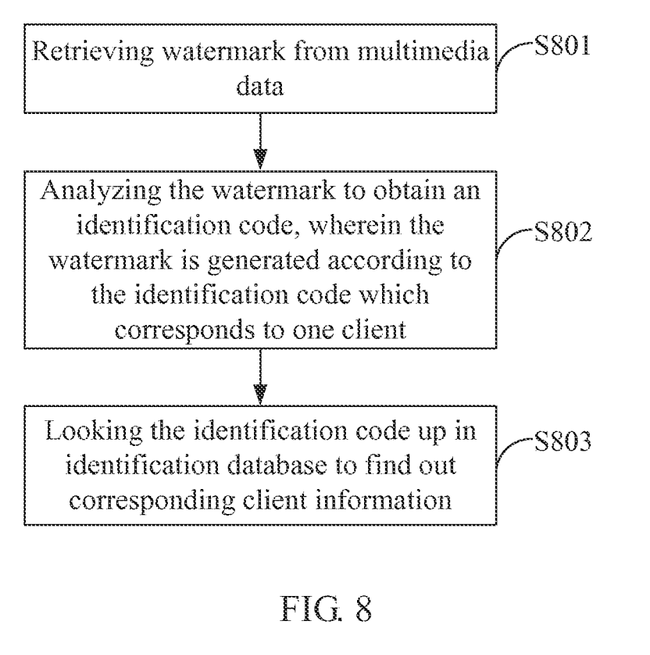
FIG. 8 is a flow chart illustrating one embodiment of a watermark-detecting method.

In the embodiment, if pirated multimedia data or suspicious multimedia data are seized, the present watermark-detecting method can be used to trace the piracy source. The watermark added onto the multimedia data is retrieved and analyzed to obtain the unique identification code associated with the exact client. Thus, the owner or author of the multimedia data can take necessary actions to stop the infringement and minimize the damage. It is easy and convenient to implement the watermark-detecting method with low costs.

Figure 9A:
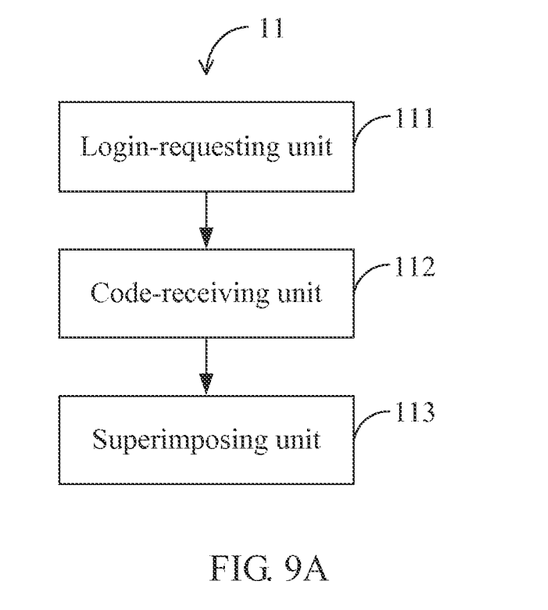
FIGS. 9A and 9B are schematic block diagrams respectively illustrating structures of a client and a server of the watermarking system of FIG. 1.
Figure 9B:
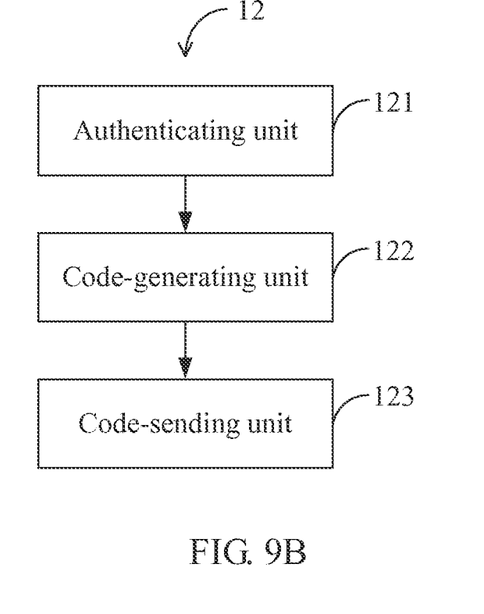

Please refer to FIGS. 9A and 9B, schematic block diagrams respectively illustrating structures of the client 11 and the server 12 of the watermarking system 1 illustrated in FIG. 1. It is to be noted that only a relative portion of the system is shown in the schematic block diagrams, but it is not intended to limit the real structure thereof. The client 11 includes a login-requesting unit 111, a code-receiving unit 112, and a superimposing unit 113; and the server 12 includes an authenticating unit 121, a code-generating unit 122, and a code-sending unit 123.

With regard to functions of the components of the client 11, the login-requesting unit 111 sends a login request to the server 12 which authenticates an access right of the client 11 to access the multimedia data and generates an identification code that is uniquely associated with the client 11 according to the login request. The code-receiving unit 112 receives the identification code sent from the server 12. The superimposing unit 113 generates an on-screen watermark according to the identification code that is uniquely associated with the client 11 and then superimposes the on-screen watermark on images of the multimedia data. A digital watermark may be further provided in the multimedia data. Thus, the code-receiving unit 112 receives the digital watermark from the server 12 which generates the digital watermark associated with the client 11 according to the login request if the client 11 is authenticated to have the access right to access the multimedia data. Thus, the superimposing unit 113 embeds the digital watermark in the multimedia data. This client 11 may be used with the method as described in Embodiment 1, and the detailed operation is not repeated here.

With regard to functions of the components of the server 12, the authenticating unit 121 receives a login request from the client 11 and authenticates an access right of the client 11 to access the multimedia data in response to the login request. Concretely, the authenticating unit 121 confirms whether the client 11 is allowed to access or play the multimedia data. The code-generating unit 122 generates an identification code that is uniquely associated with the client 11 according to the login request if the client is authenticated to have the access right to access the multimedia data. The code-sending unit 123 sends the identification code to the client 11 which generates an on-screen watermark according to the identification code that is uniquely associated with the client 11 and adds the on-screen watermark onto the multimedia data. In addition to the on-screen watermark, a digital watermark may be optionally inserted into the multimedia data. Under this condition, the code-generating unit 122 generates the digital watermark associated with the client 11 according to the login request if the client is authenticated to have the access right to access the multimedia data. Then, the code-sending unit 123 sends the digital watermark to the client 11 so that the client 11 can embed the digital watermark in the multimedia data. This server 12 may be used with the method as described in Embodiment 2, and the detailed operation is not repeated here. In addition, the client 11 and the server 12 of FIGS. 9A and 9B may be cooperated with each other to perform the method as described in Embodiment 5.

Figure 10A:
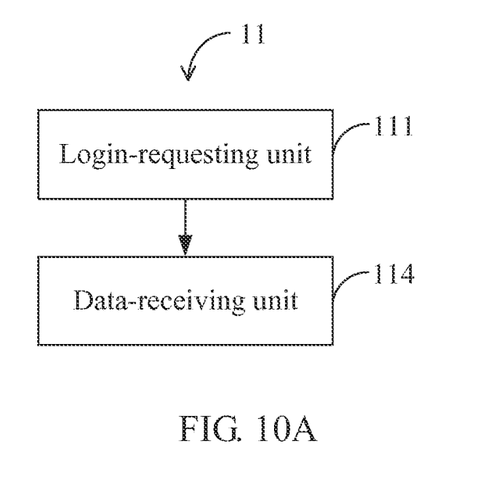
FIGS. 10A and 10B are schematic block diagrams respectively illustrating another structures of a client and a server of the watermarking system of FIG. 1.
Figure 10B:
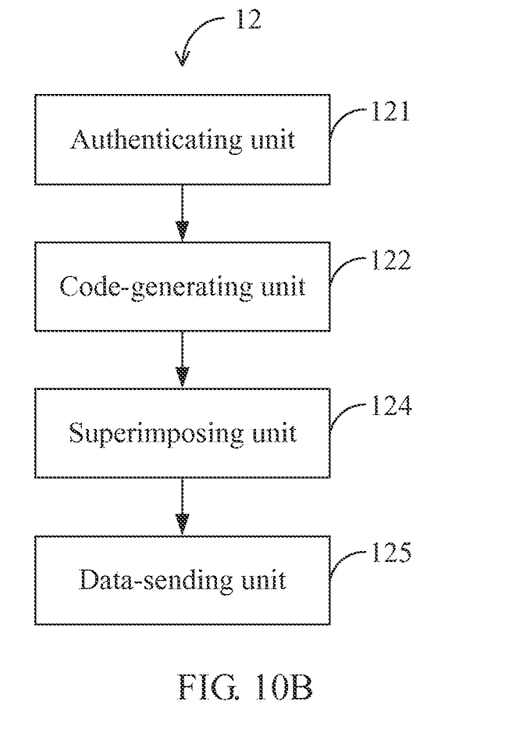

Please refer to FIGS. 10A and 10B, schematic block diagrams respectively illustrating another structure of the client 11 and the server 12 of the watermarking system 1 illustrated in FIG. 1. It is to be noted that only a relative portion of the system is shown in the schematic block diagrams, but it is not intended to limit the real structure thereof. The client 11 includes a login-requesting unit 111 and a data-receiving unit 114; and the server 12 includes an authenticating unit 121, a code-generating unit 122, a superimposing unit 124, and a data-sending unit 125.

With regard to functions of the components of the client 11, the login-requesting unit 111 sends a login request to the server 12 which generates an identification code that is uniquely associated with the client 11 according to the login request, adds an on-screen watermark onto the multimedia data according to the identification code that is uniquely associated with the client 11, and sends the multimedia data with the on-screen watermark to the client 11. The data-receiving unit 114 receives the multimedia data with the on-screen watermark to be viewed from the server 12. A digital watermark may be further provided in the multimedia data. Thus, the data-receiving unit 114 receives the multimedia data with the on-screen watermark and the digital watermark sent from the server 12. The digital watermark is generated and embedded in the multimedia data if the client is authenticated to have the access right to access the multimedia data. This client 11 may be used with the method as described in Embodiment 3, and the detailed operation is not repeated here.

With regard to functions of the components of the server 12, the authenticating unit 121 receives a login request from the client 11 and authenticates an access right of the client 11 to access the multimedia data. Concretely, the authenticating unit 121 confirms whether the client 11 is allowed to access or play the multimedia data. The code-generating unit 122 generates an identification code that is uniquely associated with the client 11 according to the login request if the client 11 is authenticated to have the access right to access the multimedia data. Different clients 11 correspond to different identification codes. The superimposing unit 124 generates an on-screen watermark according to the identification code that is uniquely associated with the client 11 and superimposes the on-screen watermark on images of the multimedia data. The data-sending unit 125 sends the watermarked multimedia data to the client 11. In addition to the on-screen watermark, a digital watermark may be optionally inserted in the multimedia data. Under this condition, the code-generating unit 122 generates the digital watermark associated with the client 11 if the client is authenticated to have the access right to access the multimedia data. The superimposing unit 124 embeds the digital watermark in the multimedia data, and the data-sending unit 125 sends the multimedia data with the on-screen watermark and the digital watermark to the client 11. This server 12 may be used with the method as described in Embodiment 4, and the detailed operation is not repeated here. In addition, the client 11 and the server 12 of FIGS. 10A and 10B may be cooperated with each other to perform the method as described in Embodiment 6.

Figure 11:
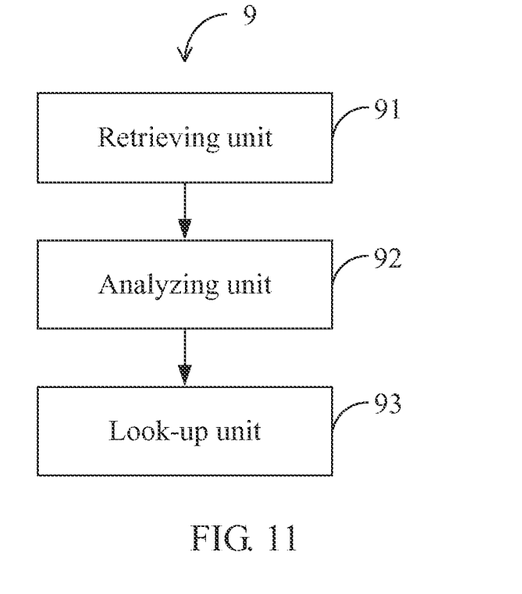
FIG. 11 is a schematic block diagram illustrating one embodiment of a watermark-detecting system.

The watermark superimposed on or embedded in the multimedia data according to the above-described methods will be detected if infringement occurs. Please refer to FIG. 11, a schematic block diagram illustrating a structure of a watermark-detecting system. It is to be noted that only a relative portion of the system is shown in the schematic block diagram, but it is not intended to limit the real structure thereof. The watermark-detecting system 9 may be integrated to the server 12 of the watermarking system 1 or separately provided. The watermark-detecting system 9 includes a retrieving unit 91, an analyzing unit 92, and a look-up unit 93. The retrieving unit 91 retrieves the on-screen watermark from the multimedia data to be inspected. The analyzing unit 92 analyzes the on-screen watermark to obtain the identification code. The watermark superimposed on or embedded in the multimedia data is generated according to the identification code which corresponds to one client 11. There is an identification database stored in the server 12. The identification database records information of every client 11 and corresponding identification code of the every client 11. The identification database may be also set up in the look-up unit 93 and updated with the server 12. The look-up unit 93 looks the identification code up in the identification database to find out the corresponding client information. This watermark-detecting system 9 may be used with the method as described in Embodiment 7, and the detailed operation is not repeated here.

It is to be noted in the above-described embodiments, all units, elements and devices are descried and denominated based on their functionality. Other units, elements or devices capable of performing at least one of the steps described above are included in the modifications of the embodiments and encompassed in the invention. In addition, the steps of the methods according to the present invention can be implemented by hardware or software. The scope of the present invention is not limited thereto.

For those having ordinary skill in the art, it is understood that all or part of the steps in the various embodiments described above can be executed by a program instructing relevant hardware or implemented by one or more sequences of computer-executable instructions. The corresponding program or instructions for causing one or more processing units to perform the methods may be stored in a computer-readable medium. The so-called medium can be, for example, a ROM/RAM, disk or optical disk, etc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A watermarking method configured to be used with a client for watermarking multimedia data, the watermarking method comprising:
   sending a login request to a server which authenticates an access right of the client to access multimedia data to be played, generates an identification code uniquely associated with the client according to the login request, and encrypts the identification code;
   receiving the encrypted identification code and the multimedia data to be played from the server;
   generating an on-screen watermark according to the encrypted identification code uniquely associated with the client; and
   adding the on-screen watermark onto the multimedia data to be played.

2. The watermarking method according to claim 1, further comprising:
   receiving a digital watermark from the server which generates the digital watermark associated with the client according to the login request if the client is authenticated to have the access right to access the multimedia data; and
   embedding the digital watermark in the multimedia data.

3. The watermarking method according to claim 2, wherein the digital watermark corresponding to each client is unique.

4. The watermarking method according to claim 2, wherein the digital watermark is an invisible digital watermark.

5. The watermarking method according to claim 1, wherein the on-screen watermark is added onto the multimedia data by superimposing the on-screen watermark on images of the multimedia data.

6. A watermarking method configured to be used with a server for watermarking multimedia data, the watermarking method comprising:
   receiving a login request from a client;
   authenticating an access right of the client to access multimedia data to be played in response to the login request;
   generating an identification code uniquely associated with the client according to the login request if the client is authenticated to have the access right to access the multimedia data to be played;
   encrypting the identification code; and
   sending the encrypted identification code and the multimedia data to be played to the client which generates the on-screen watermark according to the encrypted identification code uniquely associated with the client and adds the on-screen watermark onto the multimedia data to be played.

7. The watermarking method according to claim 6, further comprising:
   generating a digital watermark associated with the client according to the login request if the client is authenticated to have the access right to access the multimedia data; and
   sending the digital watermark to the client which embeds the digital watermark in the multimedia data.

8. The watermarking method according to claim 6, further comprising:
   recording the identification code in an identification database that stores a plurality of identification codes and associated client information.

9. A watermark-detecting method configured to be used with a watermark-detecting system for detecting a watermark added onto multimedia data, the watermark-detecting method comprising:
   retrieving the watermark from the multimedia data;
   analyzing the watermark to obtain an encrypted identification code, wherein the watermark is generated according to an identification code and the identification code corresponds to one client;
   decrypting the encrypted identification code; and
   looking the identification code up in an identification database to find out corresponding client information, the identification database storing a plurality of identification codes and associated client information.

10. A server of a watermarking system for watermarking multimedia data, the server comprising:
    one or more processors;
    a memory; and one or more program units stored in the memory and to be executed by the one or more processors, wherein the one or more program units comprise:
- an authenticating unit configured to receive a login request from a client of the watermarking system and authenticate an access right of the client to access multimedia data to be played in response to the login request;
- a code-generating unit configured to generate an identification code uniquely associated with the client according to the login request and encrypt the identification code if the client is authenticated to have the access right to access the multimedia data to be played; and
- a code sending unit configured to send the encrypted identification code and the multimedia data to be played to the client which generates the on-screen watermark according to the encrypted identification code uniquely associated with the client and adds the on-screen watermark onto the multimedia data to be played.

11. The server according to claim 10, wherein the code-generating unit generates a digital watermark associated with the client according to the login request if the client is authenticated to have the access right to access the multimedia data, and the code-sending unit sends the digital watermark to the client which embeds the digital watermark in the multimedia data.

* * * * *